United States Patent
Takeuchi

[11] 3,902,763
[45] Sept. 2, 1975

[54] ELECTRIC CONTROL DEVICE FOR AN AUTOMOTIVE BRAKE SYSTEM

[75] Inventor: Yasuhisa Takeuchi, Yokosuka, Japan

[73] Assignee: Nissan Motor Co., Ltd., Yokohama, Japan

[22] Filed: July 9, 1974

[21] Appl. No.: 486,853

[30] Foreign Application Priority Data
July 11, 1973  Japan.............................. 48-78039

[52] U.S. Cl............................. 303/21 BE; 303/20
[51] Int. Cl.............................................. B60d 8/08
[58] Field of Search ................ 188/181; 303/20, 21; 307/10 R; 317/5; 324/161–162; 340/53, 62, 262–263

[56] References Cited
UNITED STATES PATENTS
3,764,817   10/1973   Nakamura et al. .......... 303/21 BE X

*Primary Examiner*—Trygve M. Blix
*Assistant Examiner*—Stephen G. Kunin

[57] ABSTRACT

An electric control device for use with an automotive brake system including a hydraulic actuator unit to control the braking force during braking, especially when an impending skid condition is detected, characterized in that a signal to reduce the braking force are a signal to thereafter increase the braking force and issued at timings which are earlier than those usually prescribed in prior art control devices so that the delay time involved in the operation of the actuator unit can be compensated for.

3 Claims, 10 Drawing Figures

ELECTRIC CONTROL DEVICE FOR AN AUTOMOTIVE BRAKE SYSTEM

The present invention relates to a control device for a brake system of an automotive vehicle and, more particularly, to an electric control device for use in an automotive brake system having a skid control arrangement.

The skid control arrangement of an automotive brake system is effective to prevent skidding of road wheels and to minimize a stopping distance of a vehicle during braking so that the vehicle braked upon is rapidly and safely brought to a stop while allowing the driver of the vehicle to maintain directional control over the vehicle even when the vehicle is decelerated on an icy or otherwise slippery road surface.

One useful measure to determine a degree of slippage of a road wheel of an automotive vehicle on a road surface is a ratio R which is given by $$R = (Vv - Vw)/Vv,$$

where $Vv$ is a vehicle speed and $Vw$ is a circumferential speed of rotation of a road wheel of the vehicle. It is, in this instance, well known in the art of automotive brakes that the brake system should be so arranged as to maintain the slip ratio R within a range of from about 0.15 to about 0.25 for the purpose of applying brakes on the road wheel efficiently and in a stable condition. It will be, thus, most preferable if the skid control device of an automotive brake system is designed to maintain the slip ratio of the vehicle within this range even when skid is about to take place. Actually, however, this can not have been realized because of a substantial amount of delay time involved in a hydraulic actuator unit which is usually incorporated into the brake system for actuating a mechanical brake device (such as a brake drum and shoes in a drum type brake device or friction pads or shoes in a disc type brake device) associated with a road wheel or an axle of the wheel of the vehicle. Eliminating or at least minimizing such a delay time could be accomplished through use of highly sophisticated control means tailored to compensate for the delay time but has not been attempted on a practical basis because of the extremely increased production cost required of the control means.

It is, therefore, an object of the present invention to provide an improved automotive brake control device which is capable of accurately regulating a braking force on a road wheel when an impending skid condition is detected during braking.

It is another object of the present invention to provide an improved brake control device which is adapted to maintain a slip ratio of a vehicle within a predetermined range prescribed to achieve efficient and stabilized braking performances.

It is still another object of the invention to provide an improved automotive brake control device which is operative to compensate for a delay time involved in the operation of an actuator unit incorporated into the brake system.

It is still another object of the invention to provide an improved automotive brake control device which is reliable in operation and which is economical to manufacture.

Yet, it is another object of the present invention to provide an improved automotive brake control device adapted to prevent skidding of a road wheel of an automotive vehicle and to minimize a stopping distance of the vehicle during braking.

In accordance with the present invention, these and other objects will be accomplished in an electric control device which comprises a vehicle speed sensor for detecting a speed of an automotive vehicle and producing an output voltage proportional to the detected vehicle speed, a wheel speed sensor for detecting a circumferential speed of rotation of a road wheel of the vehicle and producing an output voltage which is proportional to the detected wheel speed, computing means for subtracting from the output voltage of the vehicle speed sensor a first variable reference voltage which is related to and smaller than the output voltage of the vehicle speed sensor and producing an output voltage proportional to a difference between the two voltages, first comparing means for comparing the output voltage of the computing means with the output voltage of the wheel speed sensor and producing a first control signal when the former is higher than the latter, second comparing means for comparing the output voltage of the computing means with a second variable reference voltage related to and smaller than the output voltage of the wheel speed sensor and producing a second control signal when the former is higher than the latter, first differentiating means for differentiating the output voltage of the wheel speed sensor with respect to time and producing an output signal proportional to a rate of increase of the output voltage of the wheel speed sensor, third comparing means for comparing the output voltage of the first differentiating means with a first constant reference voltage and producing a third control signal when the former is higher than the latter, second differentiating means for differentiating the output voltage of the wheel speed sensor with respect to time and producing an output voltage which is proportional to a rate decrease of the output voltage of the wheel speed sensor, fourth comparing means for comparing the output voltage of the second differentiating means with a second constant reference voltage and producing a fourth control signal when the former is higher than the latter (viz., when the road wheel is being decelerated at a rate larger than a predetermined value which is in correspondence with the second constant reference voltage), and a logical circuit responsive to the first, second, third and fourth control signals for producing a digital signal in the presence of the first control signal and the absence of the third control signal or in the presence of the second and fourth control signals and the absence of the third control signal. In one preferred embodiment of the present invention, the logical circuit comprises a logical inverter circuit having an input terminal to the third comparing means for inverting the third control signal, a first "NAND" gate circuit having a first input terminal connected to an output terminal of the first comparing means and a second input terminal connected to an output terminal of the inverter circuit, a second logical "NAND" gate circuit having a first input terminal connected to an output terminal of the second comparing means, a second input terminal connected to the output terminal of the inverter circuit and a third input terminal connected to an output terminal of the fourth comparing means, and a third "NAND" gate circuit having input terminals respectively connected to output terminals of the first and second "NAND" gate circuit.

The objects and the features of the electric brake control device according to the present invention will be more clearly understood from the following description taken in conjunction with the accompanying drawings, in which.

Figure 1:
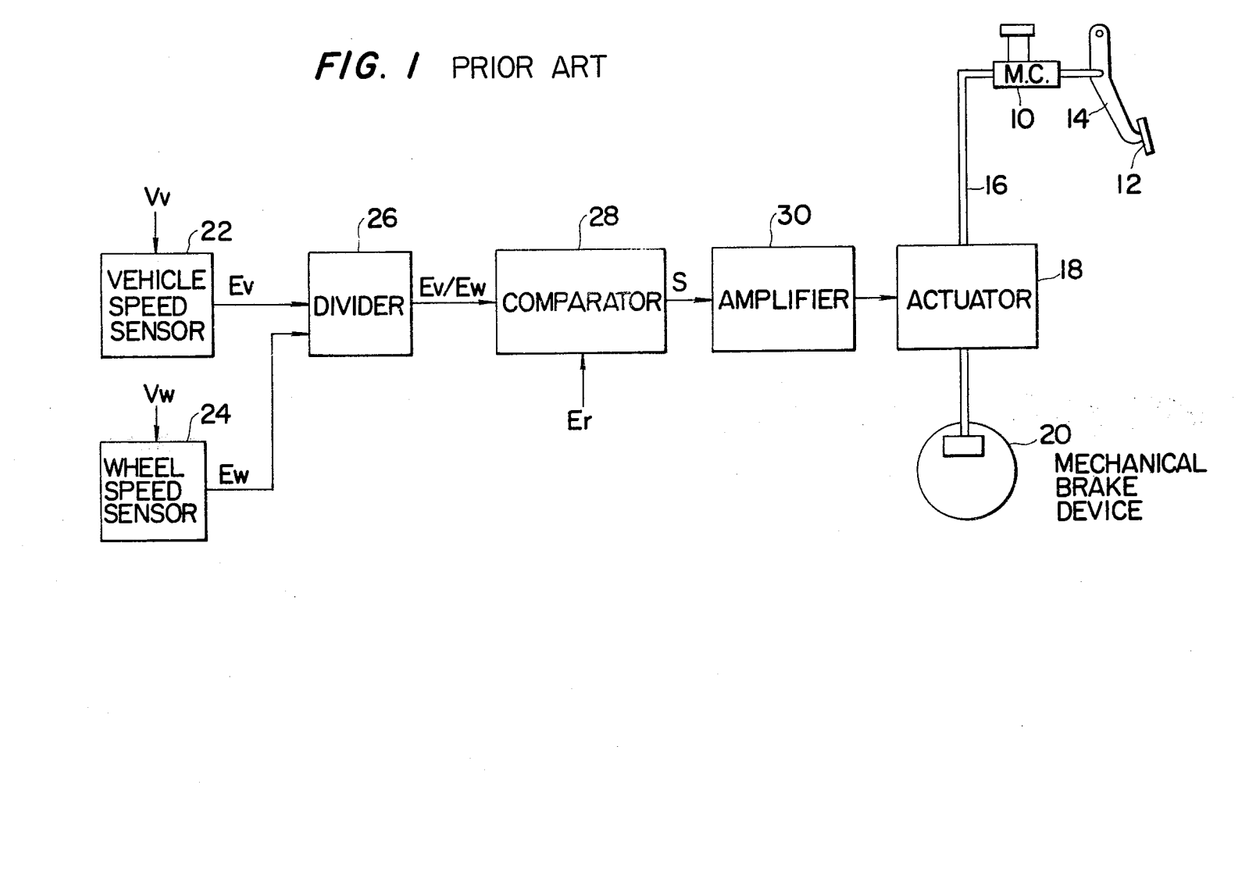
FIG. 1 is a block diagram which schematically illustrates an example of a conventional electric control device for use with an automotive brake system.

Reference will now be made to the drawings, first to FIG. 1 which illustrates an example of an existing electric brake control device which is intended to maintain the slip ratio of a road wheel within the previously mentioned range of from about 0.15 to about 0.25. The brake control is incorporated into a hydraulic brake system which is shown to comprise a master cylinder 10 which is adapted to deliver a braking fluid pressure when a brake pedal 12 operatively connected to the piston (not shown) of the master cylinder 10 through a mechanical linkage 14 is depressed by a vehicle driver. The braking fluid pressure thus developed in the master cylinder 10 is passed through a braking fluid line 16 to a hydraulic actuator unit 18 which is assumed to include, though not shown, suitable skid control valve means and a wheel cylinder to actuate a mechanical brake device 20 associated with each of road wheels of the vehicle. The mechanical brake device 20 may be of the drum type or the disc type which is well known in the art. The electric brake control device to which the present invention is directed is arranged to electrically control the hydraulic actuator unit 18 when an impending skid is detected by the control device. When, thus, the brake pedal 12 is depressed by the vehicle driver, the braking fluid pressure developed in the master cylinder 10 is directed into the hydraulic actuator unit 18 so that a braking force proportional to the supplied fluid pressure is applied to the road wheel from the mechanical brake device 20 during usual braking operation, viz., if no skidding is being invited or about to be invited between the road wheel of the vehicle and a surface of a road on which the vehicle is running. When, however, skid is about to take place between the road wheel and the road surface during braking, the electric control device responds to the impending skid condition and delivers a control signal to the actuator unit 18 so that the braking fluid pressure in the actuator unit 18 is reduced and accordingly the road wheel is released from the braking force imparted thereto from the mechanical brake device 20. The braking force is in this manner applied to and released from the road wheel several times a second until the skidding tendency is eliminated and the vehicle is brought to a full stop.

The electric brake control device thus operative to control the hydraulic actuator unit 18 comprises a vehicle speed sensor 22 which is adapted to detect a crusing speed $Vv$ of the vehicle and produce an output voltage $Ev$ proportional to the detected vehicle speed $Vv$ and a wheel speed sensor 24 which is adapted to detect a circumferential speed $Vw$ of rotation of the road wheel associated with the mechanical brake device 20 and produce an output voltage $Ew$ which is proportional to the detected wheel speed $Vw$. The output voltages $Ev$ and $Ew$ thus delivered from the vehicle speed sensor 22 and the wheel speed sensor 24, respectively, are fed to input terminals of a voltage divider circuit 26 which is adapted to electrically divide the voltage $Ew$ by the voltage $Ev$ and produce an output voltage proportional to $Ew/Ev$, viz., to a ratio of the detected wheel speed $Vw$ vs. the detected vehicle speed $Vv$. The output voltage $Ew/Ev$ of the voltage divider circuit 26 is fed to a comparator 28 and is therein compared with a predetermined reference voltage $Er$. The comparator 28 is designed to produce a digital signal S when the voltage $Ew/Ev$ is lower than the reference voltage $Er$, viz., when the following relation is achieved:

$$(Ev - Ew)/Ev > 1 - Er \qquad (1)$$

so that the slip ratio $R = (Vv - Vw)/Vv$ is larger than $1 - \rho$, wherein $\rho$ is a constant corresponding to the reference voltage $Er$.

The digital signal S thus delivered from the comparator 28 is amplified by an amplifier 30 and is supplied therefrom to an input terminal of an electrically operated control means (not shown) forming part of the hydraulic actuator unit 18 so that the braking force applied by the mechanical brake device 20 to the road wheel is lessened to eliminate an impending skid condition as previously noted.

Figures 2A, 3:
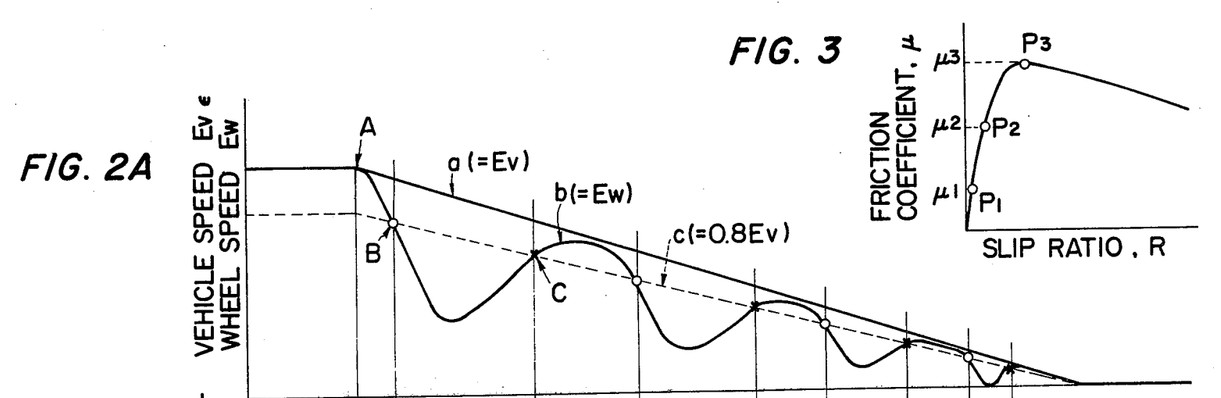
FIG. 2A is a diagram which illustrates waveforms of voltages representative of vehicle and wheel speeds detected during braking on a road wheel of an automotive vehicle equipped with the conventional electric brake control device illustrated in FIG. 1.
FIG. 3 is a graph which shows a curve indicating a relation between a slip ratio and a coefficient of friction between a tire of a vehicle road wheel and a road surface during braking.
Figure 2B:
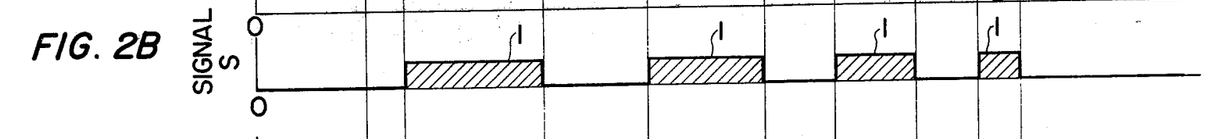
FIG. 2B is a diagram which illustrates a waveform of an output signal produced by the electric brake control device shown in FIG. 1 in response to the voltages having the waveforms shown in FIG. 2A.
Figure 2C:
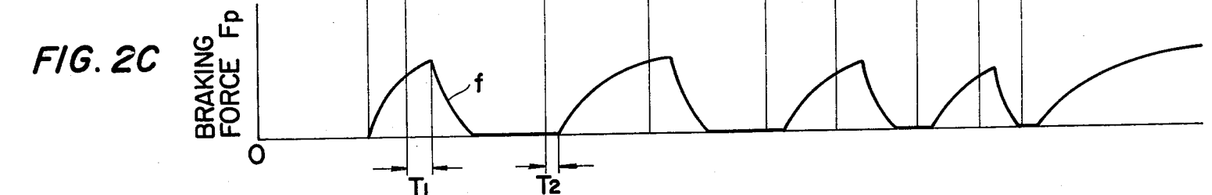
FIG. 2C is a diagram which illustrates a curve indicative of a braking force which is controlled by the signal shown in FIG. 2B.

When, in more detail, the brake pedal 12 is rapidly depressed by a vehicle driver during cruising of the vehicle, then the braking fluid pressure developed in the master cylinder 10 is passed to the hydraulic actuator unit 18 through the fluid line 16 so that the mechanical brake device 20 is actuated to apply a braking force to the road wheel with which the brake device 20 is associated. The vehicle speed $Vv$ and the wheel speed $Vw$ and accordingly the output voltages $Ev$ and $Ew$ produced by the vehicle speed sensor 22 and the wheel speed sensor 24, respectively, are consequently reduced at high rates as will be seen from curves $a$ and $b$ indicative of waveforms of the voltages $Ev$ and $Ew$, respectively, in the diagram of FIG. 2A in which point P indicates an instant at which the brake pedal 12 is initially depressed by the vehicle driver. If, in this instance, the reference voltage $Er$ impressed on the comparator 28 is selected to be in correspondence with a slip ratio R of 0.2, then the comparator 28 will produce the digital control signal S when $\rho = Vw/Vv$ is smaller than 0.8 or, in other words, the wheel speed $Vw$ is smaller than a value $0.8 \cdot Vv$. The value of $0.8 \cdot Vv$ is thus herein assumed to be a lower limit of the permissible range of the wheel speed $Vw$. In the diagram of FIG. 2A, curve $c$ indicates a voltage corresponding to $0.8 \cdot Ev$. Thus, the comparator 28 does not deliver the control signal S and accordingly the braking force applied to the road wheel is not lessened by means of the control device when the voltage $Ew$ representative of the wheel speed $Vw$ is higher than the voltage $0.8 \cdot Vv$ but, for durations in which the voltage $Ew$ is lower than the voltage $0.8 \cdot Ev$, the digital control signal S is produced from the comparator 28 as indicated in FIG. 2B so that the braking pressure applied to the road wheel is lessened by means of the hydraulic actuator unit 18 operated by the control signal S. The braking pressure, denoted by $Fp$, is in this manner varied in a pulsating form until the vehicle is brought to a full stop as indicated by a waveform $f$ shown in FIG. 2C.

The braking force $Fp$ would thus be reduced when the slip ratio R is about to increase beyond the predetermined value of 0.2 with result that the slip ratio R could be limited below 0.2 by means of the brake control device shown in FIG. 1 so that the skidding of the vehicle could be prevented and the driver's directional control over the vehicle could be maintained throughout the braking operation. Actually, however, there is usually a time delay between an instant at which the control signal S is fed to the actuator unit 18 and an instant at which the actuator unit 18 is initiated into action after the control signal has been applied to the unit, as previously pointed out briefly. As will be seen from FIGS. 2A, 2B and 2C, the control signal S is first delivered at point B after the brake pedal has been depressed as at point A because the voltage $Ew$ turns lower than the voltage $0.8 \cdot Ev$ at point B at which curves $a$ and $c$ meet each other. Due to the delay time inherent in the actuator unit 18, however, the braking force $Fp$ exerted on the road wheel of the vehicle by the mechanical brake device 20 is caused to drop in time $T_1$ after the control signal S is issued from the comparator 28. Likewise, the braking force $Fp$ is caused to rise in a subsequent cycle in a time $T_2$ after the control signal S from the comparator unit 28 has disappeared at point C at which the voltage $Ew$ turns higher than the voltage $0.8 \cdot Ev$. By reason of the delay times $T_1$ and $T_2$ thus concomitant with the operation of the actuator unit 18, the electric brake control device of the nature thus far described has been unable to control the braking fluid pressure in such a manner to maintain the wheel speed $Vw$ higher than the permissible lower level of, for example, $0.8 \cdot Vv$ throughout the braking period, thus faulting to provide full assurance of minimizing the stopping distance of the vehicle and maintaining the driver's directional control over the vehicle during braking.

FIG. 3 roughly illustrates a general relation between the previously defined slip ratio R and the coefficient of friction $\mu$ between a tire of a road wheel and a surface road on which a vehicle runs. Curved segment between points $P_1$ and $P_2$ on the curve shown in FIG. 3 indicates a region in which the wheel speed $Vw$ is made higher than a value $0.8 \cdot Vv$ due to the delay time $T_2$ of the actuator unit 18. During the region between point $P_1$ and $P_2$, the coefficient of friction $\mu$ between the wheel tire and the road surface is in a range of from $\mu_1$ to $\mu_2$ and is thus lower than a maximum value $\mu_3$ of the friction coefficient as achieved at point $P_2$ on the characteristic curve. Since, thus, the coefficient of friction coming into play when the road wheel is being braked upon by the mechanical brake device 20 is considerably short of the highest available value, the stopping distance of the vehicle tends to be prolonged due to the delay time involved in the operation of the actuator unit 18.

Figure 4:
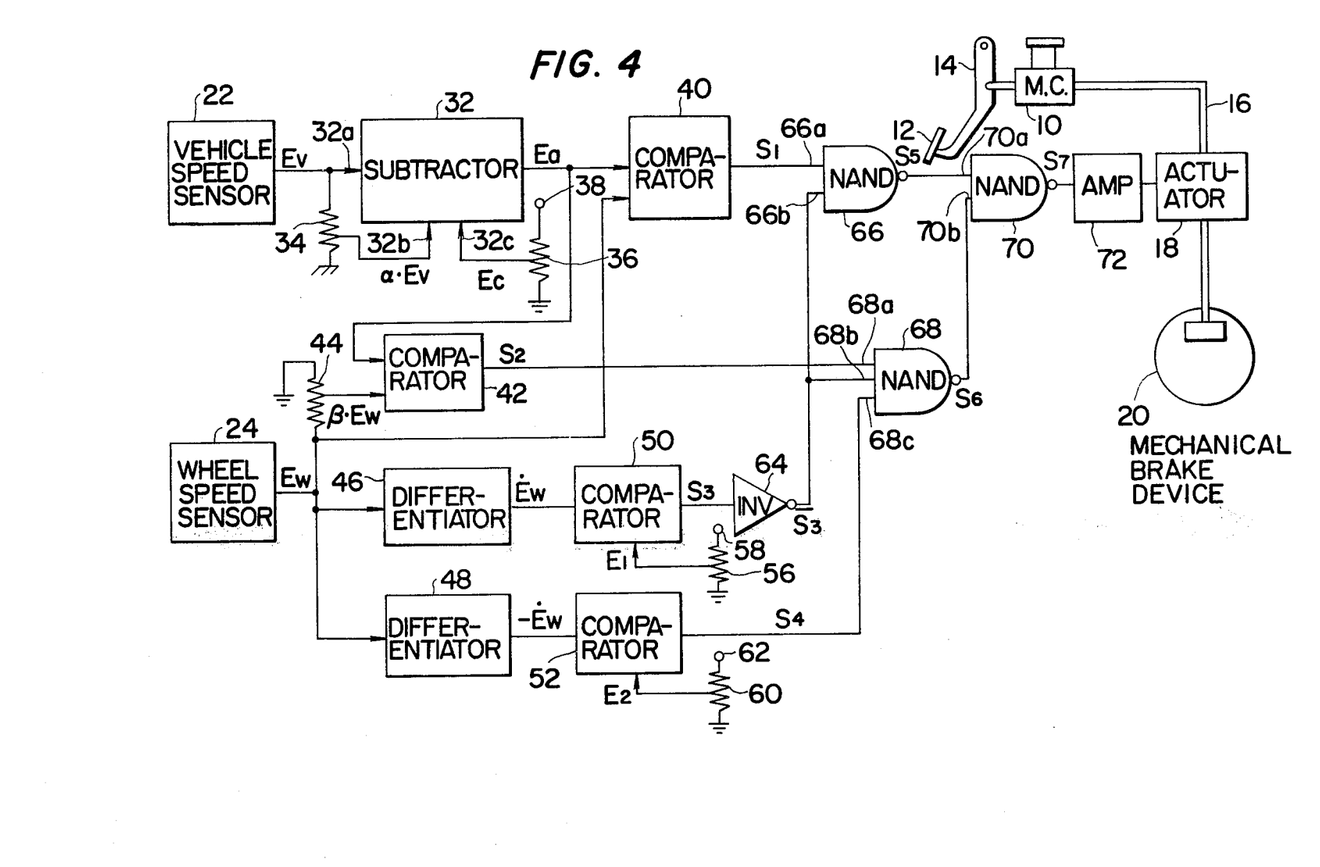
FIG. 4 is a block diagram which illustrates a preferred embodiment of the electric brake control device according to the present invention.

The goal of the present invention is to eliminate the drawbacks thus inherent in the prior art electric brake control device of the nature thus far described and is accordingly to compensate for the delay times $T_1$ and $T_2$ of the actuator unit 18 by means of a control circuit having a simple construction. FIG. 4 illustrates a preferred embodiment of the electric brake control device which is adapted to achieve this goal.

In FIG. 1, the parts and unit having their counterparts in the arrangement shown in FIG. 1 are designated by like reference numerals. The hydraulic brake system to incorporate the electric brake control device embodying the present invention is thus shown to include a master cylinder 10, a brake pedal 12 operatively connected to the master cylinder 10 through a mechanical linkage 14, a hydraulic actuator unit 18 which is in communication with the master cylinder 10 through a fluid line 16 and which is assumed to include a wheel cylinder, and a mechanical brake device 20 to be actuated by the actuator unit 18. As previously mentioned, the mechanical brake device may be of the drum type or the disc type and is capable of applying a braking force to an associated road wheel (not shown) of the vehicle when actuated by the wheel cylinder forming part of the hydraulic actuator unit 18. The master cylinder 10 may be of the single or tandem type. Only one mechanical brake device 20 is herein shown and accordingly it is assumed that only one of the road wheels of the vehicle is to be controlled by the brake control device, such is merely for the sake of simplicity of illustration and, therefore, the electric brake control device according to the present invention may be arranged to be operable on two or more of the road wheels of the vehicle if the number of component elements making up the electric circuitry of the control device is appropriately increased in accordance with a desired number of road wheels to be controlled.

The hydraulic actuator unit 18 has incorporated therein an electrically actuated skid control means operable to reduce the braking force to be applied to the road wheel from the mechanical brake device 20. When kept de-energized, the skid control means remains inoperative so that the braking fluid pressure delivered from the master cylinder 10 is permitted to act on the mechanical brake device 20 during usual braking, viz., in the absence of a skidding condition. When, however, an impending skid is detected by the brake control device to be described, the skid control means is energized to reduce the braking fluid pressure in the actuator unit 18 and accordingly to prevent the road wheel from being locked up during braking.

The electric brake control device embodying the present invention includes a vehicle speed sensor 22 and a wheel speed sensor 24 similarly to the prior art brake control device illustrated in FIG. 1. As previously mentioned with reference to FIG. 1, the vehicle speed sensor 22 is adapted to detect a cruising speed $Vv$ of the vehicle and produce an output voltage $Ev$ proportional to the detected vehicle speed $Vv$ whereas the wheel speed sensor 24 is operative to detect a circumferential speed $Vw$ of rotation of the road wheel and produce an output voltage $Ew$ which is proportional to the detected wheel speed $Vw$. The vehicle speed sensor 22 may be constituted by an alternating current generator mounted on and driven by a road wheel which is independent of the usual front and rear road wheels or a Doppler radar for automotive uses.

The vehicle speed sensor 22 has an output terminal connected to computing means which include a subtractor circuit 32 having first, second and third input terminals 32a, 32b and 32c, respectively. The first input terminal 32a of the substractor circuit 32 is connected direct to the output terminal of the vehicle speed sensor 22. The second input terminal 32b of the subtractor circuit 32 is connected through a first voltage dividing resistor 34 to the output terminal of the vehicle speed sensor 22 whereas the third input terminal 32c of the subtractor circuit 32 is connected through a second voltage dividing resistor 36 to a terminal 38 on which a constant voltage is impressed. The first voltage dividing resistor 34 is so arranged as to produce a voltage $\alpha \cdot Ev$ (wherein is a constant which is smaller than 1) between the second input terminal 32b of the subtractor 32 and the output terminal of the vehicle speed sensor 22 whilst the second voltage dividing resistor 36 is so set as to produce a constant voltage $Ec$ between the third input terminal 32c of the subtractor circuit 32 and the terminal 38 of a constant voltage source (not shown). The voltage $\alpha \cdot Ev$ thus impressed on the second input terminal 32b of the subtractor circuit 32 is proportional to and smaller than the voltage $Ev$ delivered from the output terminal of the vehicle speed sensor 22. The subtractor circuit 32 thus supplied with the voltages $Ev$, $\alpha \cdot Ev$ and $Ec$ is operative to electrically subtract the voltage $\alpha \cdot Ev$ and $Ec$ from the voltage $Ev$ and thus produce an output voltage $Ea$ which is equal to $Ev - (\alpha \cdot Ev + Ec)$, the value of the term in the parenthesis being a function of the voltage $Ev$ and thus varying with the vehicle speed $Vv$ detected by the vehicle speed sensor 22.

The subtractor circuit 32 has an output terminal connected to one input terminal of a first comparator 40 which has another input terminal connected to an output terminal of the wheel speed sensor 24. The comparator 40 is thus operative to compare the output voltage $Ea$ from the subtractor circuit 32 with the output voltage $Ew$ from the wheel speed sensor 24 and produce a first control signal $S_1$ of logical 1 when the voltage $Ea$ is higher than the voltage $Ew$, viz. no., when the following relation is established:

$$Ev - \alpha \cdot Ev - Ec > Ew. \tag{2}$$

The output terminal of the subtractor circuit 32 is further connected to one input terminal of a second comparator 42 which has another input terminal connected through a voltage dividing resistor 44 to the output terminal of the wheel speed sensor 24 as shown. The voltage dividing resistor 44 is so arranged as to produce a voltage $\beta \cdot Ew$ (wherein $\beta$ is a constant which is smaller than 1) between the output terminal of the wheel speed sensor 24 and the input terminal of the second comparator 42. The voltage $\beta \cdot Ew$ is a function of the voltage $Ew$ produced by the wheel speed sensor 24 and thus varies with the wheel speed $Vw$ which is detected by the sensor 24. The second comparator 42 is operative to compare the variable output voltages $Ea$ and $\beta \cdot Ew$ with each other and produce a second control signal $S_2$ of a logical 1 form when the voltage $Ea$ is higher than $\beta \cdot Ew$, viz., when the following relation is established:

$$Ev - \alpha \cdot Ev - Ec > \beta \cdot Ew \tag{3}$$

The output terminal of the wheel speed sensor 24 is further connected to input terminals of first and second differentiating circuits 46 and 48, respectively. The first differentiating circuit 46 is adapted to be actuated only when the output voltage $Ew$ produced from the wheel speed sensor 24 is on the increase, viz., the wheel speed $Vw$ is increasing and, conversely, the second differentiating circuit 48 is adpated to be actuated only when the output voltage $Ew$ is on the decrease, viz., the wheel speed $Vw$ is being reduced. When actuated, the first differentiating circuit 46 electrically differentiate the voltage $Ew$ with respect to time and produces an output voltage $\dot{E}w$ which is proportional to the rate increase of the wheel speed $Vw$, viz., the degree of acceleration of the road wheel. Likewise, the second differentiating circuit 48 is operative, when actuated, to differentiate the voltage $Ew$ with respect to time and produces an output voltage $-\dot{E}w$ (in which instance $\dot{E}w$ is smaller than 0) which is proportional to the rate of decrease of the wheel speed $Vw$, viz. no., the degree of deceleration of the road wheel.

The first differentiating circuit 46 has an output terminal connected to an input terminal of a third comparator 50, whereas the second differentiating circuit 48 has an output terminal connected to a fourth comparator 52. The third comparator 50 has another input terminal connected through a voltage dividing resistor 54 to a terminal 56 of a constant voltage source (not shown) and, likewise, the fourth comparator 52 has another input terminal connected through a voltage dividing resistor 60 to a terminal 62 of a constant voltage source (not shown). The voltage dividing resistors 56 and 60 are arranged in such a manner as to apply positive constant reference voltages $E_1$ and $E_2$ to the third and fourth comparators 50 and 52, respectively. The third comparator 50 is thus operative to compare the output voltage $\dot{E}w$ of the first differentiating circuit 46 with the constant reference voltage $E_1$ and produces a third control signal $S_3$ of a logical 1 form when the voltage $\dot{E}w$ is higher than the reference voltage $E_1$ so that the following relation holds:

$$\dot{E}w > E_1 > 0. \tag{4}$$

Similarly, the fourth comparator 52 is operative to compare the output voltage $-\dot{E}w$ from the second differentiating circuit 48 with the positive constant reference voltage $E_2$ and produces a fourth control signal $S_4$ when the voltage $-\dot{E}w$ is higher than the reference voltage $E_2$ so that the following relation is established:

$$-\dot{E}w > E_2 > 0. \tag{5}$$

Figures 5A, 5B:
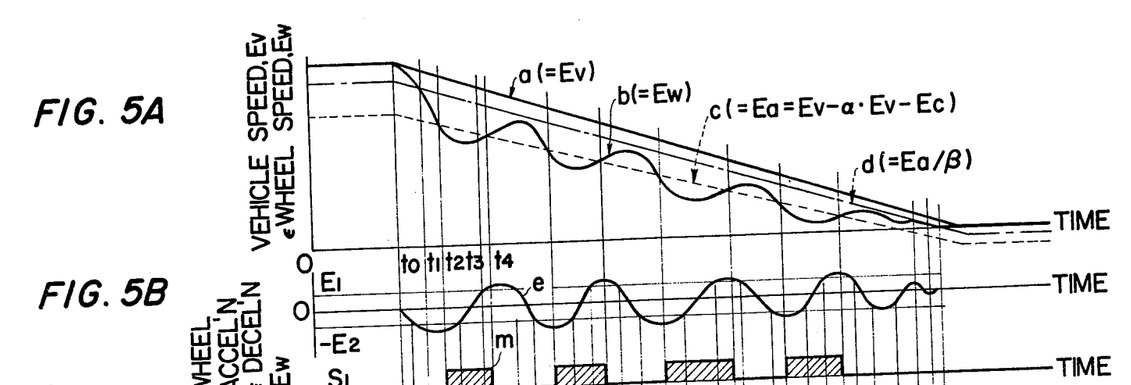
FIG. 5A is a diagram which shows waveforms of voltages appearing or computed in the brake control device illustrated in FIG. 4.
FIG. 5B is a diagram showing a waveform of a voltage representative of a rate of increase or decrease of the wheel speed detected in the brake control device of FIG. 4.

The voltages $Ev$, $Ew$ and $Ea$ above mentioned are indicated by curves $a$, $b$ and $c$, respectively, in the diagram of FIG. 5A. Curve $d$ in FIG. 5A indicates the voltage $Va$ divided by the constant which is dictated by the voltage dividing resistor 44 connected to the second comparator 42. FIG. 5B illustrates a curve $e$ which is indicative of the waveform of the voltage $\dot{E}w$, wherein it is apparent that the segments of the curve $e$ above the zero level indicate the output voltage produced by the first differentiating circuit 46 and the segments of the curve $e$ below the zero level indicate the negative value of the output voltage of the second differentiating circuit 48.

The electric brake control device embodying the present invention further comprises a logical circuit which is adapted to be responsive to the control signals $S_1$, $S_2$, $S_3$ and $S_4$ and produce a final control signal to be supplied to the skid control means of the hydraulic actuator unit. Turning back to FIG. 4, the logical circuit comprises a logical inverter or negation circuit 64 which has an input terminal connected to an output terminal of the third comparator 50 so as to produce an inverted third control signal $\overline{S}_3$ in the presence of the output signal $S_3$ from the comparator 50. The logical circuit further comprises first and second logical "NAND" gate circuits 66 and 68, respectively. The first logical "NAND" gate circuit 66 has a first input terminal 66a connected to an output terminal of the first comparator 40 and a second input terminal 66b which is connected to an output terminal of the logical inverter circuit 64 above mentioned. The first logical "NAND" gate circuit 66 thus produces a fifth control signal $S_5$ of a logical 1 form in the absence of both of the first and inverted third control signals $S_1$ and $\overline{S}_3$, respectively or in the presence of one of the control signals $S_1$ and $\overline{S}_3$ and in the concurrent absence of the other of the two signals. In other words, the first logical "NAND" gate circuit 66 produce a signal of logical 0 when concurrently supplied with both of the first control signal $S_1$ and the inverted third control signal $\overline{S}_3$. The fifth control signal $S_5$ produced from the first logical "NAND" gate circuit 66 is therefore written in the boolean form:

$$S_5 = \overline{S_1 \cdot \overline{S}_3}. \tag{6}$$

Thus, the conditions to enable the first logical "NAND" gate circuit 66 to produce the fifth control signal $S_5$ of logical 1 are those which will nagate the relation (2) and simultaneously satisfy the relation (4) previously mentioned. On the other hand, the second logical "NAND" gate circuit 68 has a first input terminal 68a connected to an output terminal of the second comparator 42, a second input terminal 68b connected to the output terminal of the logical inverter circuit 64, and a third input terminal 68c connected to an output terminal of the fourth comparator 52. The second logical "NAND" gate circuit 68 is thus operative to produce a sixth control signal $S_6$ of logical 1 in the absence of at least one of the second control signal $S_2$, the inverted third control signal $\overline{S}_3$ and the fourth control signal $S_4$. The sixth control signal produced from the second logical "NAND" gate circuit 68 is accordingly written in the boolean form of:

$$S_6 = \overline{S_2 \cdot \overline{S}_3 \cdot S_4} \tag{7}$$

The conditions to enable the second logical "NAND" gate circuit 68 are thus those which will negate the relations (2) and (5) and simultaneously satisfy the relation (4) previously mentioned.

The logical circuit further comprises a third logical "NAND" gate circuit 70 which has a first input terminal connected to an output terminal of the first logical "AND" gate circuit 66 and a second input terminal connected to an output terminal of the logical "NAND" gate circuit 68. The third logical "NAND" gate circuit 70 is thus operative to produce a seventh or final control signal $S_7$ of a logical 1 form either in the absence of both of the fifth and sixth control signals $S_5$ and $S_6$ from the first and second logical "NAND" gate circuits 66 and 68 or in the absence of one of the fifth and sixth control signals $S_5$ and $S_6$ and in the concurrent presence of the other of the control signals $S_5$ and $S_6$. The seventh or final control signal $S_7$ is therefore written in the boolean form of:

$$S_7 = \overline{S_5 \cdot S_6} = \overline{\overline{S_1 \cdot \overline{S}_3} \cdot \overline{S_2 \cdot \overline{S}_3 \cdot S_4}} = S_1 \cdot \overline{S}_3 + S_2 \cdot \overline{S}_3 \cdot S_4 \tag{8}$$

The conditions to enable the third logical "NAND" gate circuit to produce the control signal $S_7$ are, thus, those which will satisfy the relations (2), (3) and (5) and simultaneously negate the relation (4). In other words, the seventh or final control signal $S_7$ of logical 1 is issued from the third logical "NAND" gate circuit 70 when the output voltage $Ea$ produced by the subtractor circuit 32 is higher than the voltage $Ew$ representative of the wheel speed $Vw$ and simultaneously the voltage $\dot{E}w$ representative of the rate of change of the wheel speed $Vw$ is lower than the predetermined lever $E_1$ or when the voltage $Ea$ is higher than the voltage $\beta \cdot Ew$ (or, in other words, the curve $d$ indicatige of the voltage $Ea/\beta$ is above the curve $b$ indicative of the voltage $Ew$ in FIG. 5A) and simultaneously the voltage $\dot{E}w$ representative of the rate of change of the wheel speed $Vw$ is lower than the predetermined levels $E_1$ and $-E_2$.

The third logical "NAND" gate circuit 70 has an output terminal connected through an amplifier 72 to an input terminal of the electrically operated skid control means incorporated into the hydraulic actuator unit 18 previously mentioned.

Figure 5C:
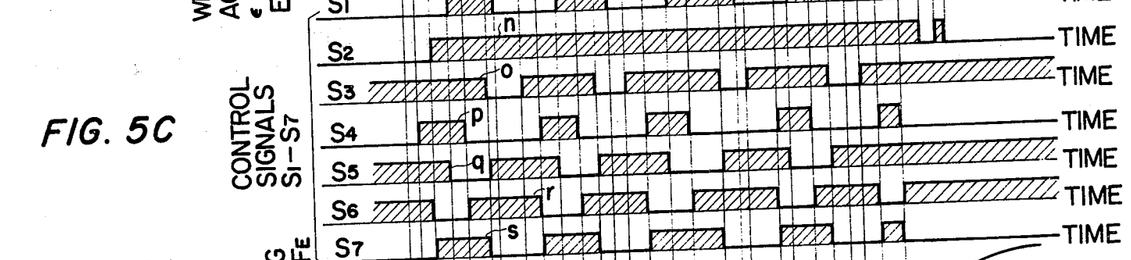
FIG. 5C is a diagram which illustrates waveforms of various digital control signals produced in the brake control device of FIG. 4.
Figure 5D:
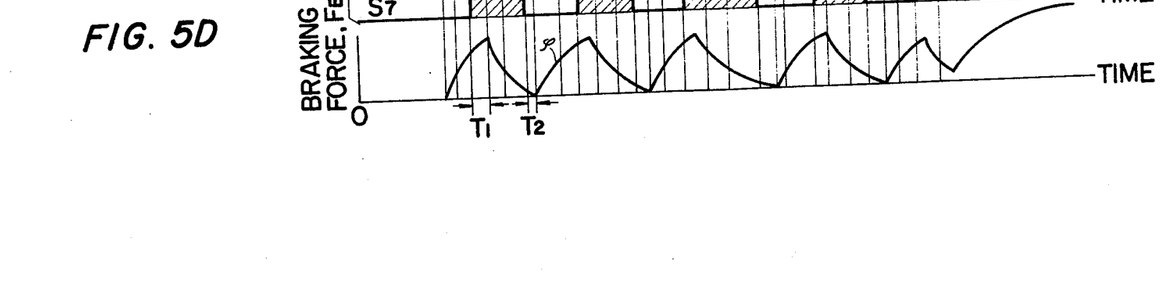
FIG. 5D is a diagram showing a curve which is indicative of a braking force applied to a road wheel of a vehicle under the control of the signals illustrated in FIG. 5C.

FIG. 5C illustrates waveforms, $m$, $n$, $o$, $p$, $q$, $r$ and $s$ of the first, second, inverted third, fourth, fifth, sixth and seventh digital control signals $S_1$, $S_2$, $\overline{S}_3$, $S_4$, $S_5$, $S_6$ and $S_7$, respectively, produced in the manners thus far described when the voltages $Ev$, $Ew$, $Ea$ and $\dot{E}w$ are produced as indicated in FIGS. 5A and 5B. FIG. 5D illustrates a waveform $\phi$ of a braking force $Fi$ which is applied to the road wheel from the mechanical brake device 20 (FIG. 4) under the control of the control signal $S_7$ delivered from the electric brake control device embodying the present invention.

The operation of the electric brake control device which is constructed and arranged in the manners thus far set forth will now be described with concurrent reference to FIGS. 1 and 5A to 5D.

When the brake pedal 12 is rapidly depressed by a vehicle driver at time $t_1$ during cruising of the vehicle, an increased fluid pressure is developed in the master cylinder 10 so that the braking force $Fi$ applied to the road wheel from the mechanical brake device 20 increases. Brakes are thus applied to the road wheels of the vehicle so that the vehicle speed $Vv$ and the wheel speed $Vw$ decrease. The voltages $Ev$ and $Ew$ representative of the detected vehicle and wheel speeds consequently drop as indicated by curves $a$ and $b$ in FIG. 5A. Due to the drop of the voltage $Ev$, the output voltage $Ea$ (which equals $Ev - \alpha \cdot Ev - Ec$) produced from the subtractor circuit 32 also decreases as indicated by curve $c$ in FIG. 5A. When the input voltage $\beta \cdot Ew$ impressed on the second comparator 42 becomes lower than the voltage $Va$ at time $t_2$ (or the voltage $Ew$ indicated by curve $b$ becomes lower than the voltage $Ea/\beta$ indicated by curve $d$ in FIG. 5A), the relation (3) previously mentioned is satisfied so that the second control signal $S_2$ of logical 1 is issued from the second comparator 42 as indicated by the waveform $n$ shown in FIG. 5C. When, thereafter, the voltage $Ew$ representative of the wheel speed $Vw$ become lower than the voltage $Ea$ at time $t_3$ so that the relation (2) is satisfied, then the first control signal $S_1$ of logical 1 is delivered from the first comparator 40 as indicated by the waveform $m$ in FIG. 5C. The first control signal $S_1$ thus appears repeatedly or cyclically when the voltage $Ew$ becomes lower than the voltage $Ev$ which is the function of the voltage $Ev$.

At the incipient stage of the braking operation, the road wheel is decelerated by the braking force exerted thereon from the mechanical brake device 20 so that the second differentiating circuit 48 becomes operative to produce the output voltage $-\dot{E}w$ which is representative of the rate of decrease of the wheel speed $Vw$. When the output voltage $-\dot{E}w$ from the second differentiating circuit exceeds the predetermined level $E_2$, the fourth comparator 52 produces the fourth control signal $S_4$ of logical 1, as indicated by the waveform $p$ shown in FIG. 5C. Since, under these conditions, the first differentiating circuit 46 is held inoperative, the logical inverter circuit 64 produces the inverted third control signal $\overline{S}_3$ of logical 1 as indicated by the waveform $o$ in FIG. 5C in the absence of the third control signal $S_3$ at the output terminal of the third comparator 50, and if the first and second control signals $S_1$ and $S_2$ are being produced from the first and second comparators 40 and 42, respectively, as above mentioned, the first logical "NAND" gate circuit 66 is energized at both of its first and second input terminals 66a and 66b and simultaneously the second logical "NAND" gate circuit 68 and energized at all of its first, second and third input terminals 68a, 68b and 68c. The first and second logical "NAND" gate circuits 66 and 68 therefore produce output signals of logical 0 so that the third "NAND" gate circuit 70 produces the seventh control signal $S_7$ of logical 1. The control signal $S_2$ of logical 1 is amplified by the amplifier 72 and is thereafter supplied to the skid control means of the hydraulic actuator unit 18 whereby the braking force $Fi$ applied from the mechanical brake device 20 to the road wheel is reduced. As a consequence, the road wheel is permitted to turn at an increasing speed as will be seen from curves $b$ and $e$ shown in FIGS. 5A and 5B, respectively.

At the moment the road wheel is thus accelerated, the second differentiating circuit 48 is rendered inoperative with the result that the fourth comparator 52 ceases to produce the fourth control signal $S_4$ of logical 1. The second logical "NAND" gate circuit 68 accordingly produces the sixth control signal $S_6$ of logical 1 as indicated by the waveform $r$ in FIG. 5C but, in the absence of the fifth control signal $S_5$ of logical 1 at the output terminal of the first logical "NAND" gate circuit 66, the third logical "NAND" gate circuit 70 remains operative to produce the seventh or final control signals $S_7$ of logical 1 so that the skid control means in the hydraulic actuator unit 18 is held in the condition to reduce the braking fluid pressure.

When, under these conditions, the degree of acceleration of the road wheel exceeds a predetermined level so that the voltage $\dot{E}w$ produced by the first differentiating circuit 46 becomes higher than the reference voltage $E_1$ at time $t_3$, the third control signal $S_3$ of logical 1 is delivered from the third comparator 50 so that the logical inverter circuit 54 produces an output signal of logical 0. Since, in this instance, the second differentiating circuit 48 is held inoperative so that the fourth control signal $S_4$ of logical 1 is absent at the output terminal of the fourth comparator 52, the first logical "NAND" gate circuit 66 is permitted to produce the fifth control signal $S_5$ of logical 1 as indicated by the waveform $q$ in FIG. 5C in the absence of the first control signal $S_1$ from the first comparator 40. Both of the first and second logical "NAND" gate circuits 66 and 68 thus produce the control signals $S_5$ and $S_6$ of logical 1 so that the third logical "NAND" gate circuit 70 is disabled from delivering the seventh of final control signal $S_7$ of logical 1. The skid control means incorporated into the hydraulic actuator unit 18 is consequently de-energized so that the braking force $Fi$ applied to the road wheel is for a second time increased. The road wheel is in this manner decelerated by the increasing braking force and, when the rate of decrease of the wheel speed exceeds the predetermined level given by the constant reference voltage $E_2$, then the skid control means in the actuator unit 18 is energized for a second time in a manner previously discussed so that the braking force exerted on the road wheel is reduced. The braking force $Fi$ is thus decreased and increased cyclically as indicated by curve $\phi$ in FIG. 5D until the vehicle is brought to a full stop.

The braking actions on the road wheel is thus monitored by the hydraulic actuator unit 18 under the control of the final control signal $S_7$ delivered from the electric brake control device thus far described. As previously pointed out, an appreciable amount of delay time is caused between a time at which the actuator unit 18 receives the control signal of logical 1 or 0 from the electric brake control device and a time at which the mechanical brake device 20 is initiated into action by the actuator unit 18. When, for example, the hydraulic actuator unit 18 is supplied with the control signal of logical 1, the actuator unit 18 becomes effective to lessen the braking force in a time $T_1$ after the control signal has been applied to the actuator unit 18. When, conversely, the hydraulic actuator unit 18 is supplied with the control signal of logical 0, the actuator unit 18 becomes effective to increase the braking force in a time $T_2$ after the control signal has been applied to the actuator unit 18, as previously described with reference to FIG. 2C. This is because of the fact that, in the prior art electric brake control device illustrated in FIG. 1, the control signal of logical 1 to reduce the braking force is issued at a point in the vicinity of the time $t_2$ (FIG. 5A) at which the voltage $Ew$ representative of the wheel speed $Vw$ turns lower than the voltage $Ea$ varying with the vehicle speed $Vv$, whereas the control signal of logical 0 is issued at a point in the vicinity of time $t_4$ (FIG. 5A) at which the voltage $Ew$ for a second time becomes higher than the voltage $Ea$. In the electric brake control device embodying the present invention, however, the control signal of logical 1 to reduce the braking force is issued at time $t_1$ (FIG. 5A) at which the voltage $Ew$ representative of the wheel speed $Vw$ turns lower than the voltage $Ea/\beta$ also varying with the vehicle speed $Vv$ but higher than the voltage $Ea$ (because is smaller than 1) whilst the control signal of logical 0 to increase the braking force is issued earlier at time $t_3$ (FIG. 5A) at which the voltage $\dot{E}w$ representative of the rate of increase of the wheel speed $Vw$ becomes higher than the predetermined $E_1$. Thus, the control signal of logical 1 to reduce the braking force is applied to the hydraulic actuator unit 18 at a timing which is earlier by time period of $T_1$ than the timing at which such a signal is applied to the actuator unit by the prior art control device and the control signal of logical 0 is applied to the actuator unit 18 at a timing which is earlier by a time period of $T_2$ than the timing at which such a signal is applied to the actuator unit. The delay times $T_1$ and $T_2$ involved in the operation of the actuator unit are, in this manner, compensated for by the electric control device according to the present invention and, by virtue of this, the braking operation can be performed in sufficiently stable conditions and the fluctuations of the wheel speed can be reduced to a minimum.

Since moreover, the voltage $Va$ produced from the subtractor circuit 32 forming part of the computing means in the brake control device embodying the present invention is kept appropriately lower than the voltage $Vv$ representative of the vehicle speed $Vv$, the voltage $Ew$ is kept sufficiently lower than the voltage $Ev$ and accordingly the wheel speed $Vw$ is prevented from closely approaching the vehicle speed $Vv$ during braking in spite of the delay involved in the operation of the actuator unit, as will be understood from comparison between the curves $a$ and $b$ in FIG. 5A. This is an important feature of the control device according to the present invention because the coefficient of friction available between the tire of the road wheel and the surface of the road is in the vicinity of its peak (indicated by $\mu_3$ in the graph of FIG. 3) and, accordingly, the braking on the vehicle can be effected at an increased efficiency.

What is claimed is:

1. An electric control device for an automotive brake system having skid control means, comprising a vehicle speed sensor for detecting a speed of an automotive vehicle and producing an output voltage proportional to the detected vehicle speed, a wheel speed sensor for detecting a circumferential speed of rotation of a road wheel of the vehicle and producing an output voltage which is proportional to the detected wheel speed, computing means for subtracting from the output voltage of the vehicle speed sensor a first variable reference voltage which is related to and smaller than the output voltage of the vehicle speed sensor and producing an output voltage proportional to a difference between the two voltages, first comparing means for comparing the output voltage of the computing means with the output voltage of the wheel speed sensor and producing a first control signal when the former is higher than the latter, second comparing means for comparing the output voltage of the computing means with a second variable reference voltage related to and smaller than the output voltage of the wheel speed sensor and producing a second control signal when the former is higher than the latter, first differentiating means for differentiating the output voltage of the wheel speed sensor with respect to time and producing an output signal proportional to a rate of increase of the output voltage of the wheel speed sensor, third comparing means for comparing the output voltage of the first differentiating means with a first constant reference voltage and producing a third control signal when the former is higher than the latter, second differentiating means for differentiating the output voltage of the wheel speed sensor with respect to time and producing an output voltage which is proportional to a rate decrease of the output voltage of the wheel speed sensor, fourth comparing means for comparing the output voltage of the second differentiating means with a second constant reference voltage and producing a fourth control signal when the former is higher than the latter, and a logical circuit responsive to the first, second, third and fourth control signals for producing a digital signal in the presence of the first control signal and the absence of the third control signal or in the presence of the second and fourth control signals and the absence of the third control signal for actuating said skid control means to reduce a braking force to be applied to said road wheel.

2. An electric control device as claimed in claim 1, in which said logical circuit comprises a logical inverter circuit having an input terminal to the third comparing means for inverting the third control signal, a first "NAND" gate circuit having a first input terminal connected to an output terminal of said first comparing means and a second input terminal connected to an output terminal of the inverter circuit, a second logical "NAND" gate circuit having a first input terminal connected to an output terminal of said second comparing means, a second input terminal connected to the output terminal of the inverter circuit and a third input terminal connected to an output terminal of said fourth comparing means, and a third "NAND" gate circuit having input terminals respectively connected to output terminals of the first and second "NAND" gate circuit.

3. An electric brake control device as claimed in claim 1, in which said computing means comprise a subtractor circuit having a first input terminal connected direct to said vehicle speed sensor, a second input terminal connected through a first voltage divider to the output terminal of the vehicle speed sensor and a third input terminal connected to a constant voltage source so that said first variable reference voltage equals the output voltage of the vehicle speed sensor minus the sum of voltages applied to the second and third input terminals of the subtractor circuit.

* * * * *